United States Patent
Busnot et al.

(12)

(10) Patent No.: US 6,419,735 B1
(45) Date of Patent: Jul. 16, 2002

(54) COMPOSITION BASED ON SAMARIUM SESQUISULPHIDE, PREPARATION METHOD AND USE AS COLORING PIGMENT

(75) Inventors: Sylvain Busnot, Elincourt Sainte Marguerite; Pierre Macaudiere, Asnieres-sur-Seine, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/485,385

(22) PCT Filed: Aug. 7, 1998

(86) PCT No.: PCT/FR98/01775
§ 371 (c)(1),
(2), (4) Date: May 19, 2000

(87) PCT Pub. No.: WO99/07639
PCT Pub. Date: Feb. 18, 1999

(30) Foreign Application Priority Data

Aug. 8, 1997 (FR) .............................................. 97 10229

(51) Int. Cl.[7] ............................. C01F 17/00; C09C 1/00; C09C 1/02
(52) U.S. Cl. ..................... 106/401; 106/419; 106/436; 106/450; 106/461; 106/481; 423/263
(58) Field of Search ................................ 106/461, 401, 106/419, 436, 450, 481; 423/263

(56) References Cited

U.S. PATENT DOCUMENTS

| | | | | |
|---|---|---|---|---|
| 5,348,581 A | * | 9/1994 | Chopin et al. | 106/461 |
| 5,401,309 A | * | 3/1995 | Chopin et al. | 106/461 |
| 5,755,868 A | * | 5/1998 | Macaudiere | 106/401 |
| 5,968,247 A | * | 10/1999 | Macaudiere | 106/286.7 |
| 6,136,084 A | * | 10/2000 | Busnot et al. | 106/401 |
| 6,221,473 B1 | * | 4/2001 | Aubert et al. | 106/408 |

FOREIGN PATENT DOCUMENTS

| | | | |
|---|---|---|---|
| EP | 0 203838 | 12/1986 | C09C/1/00 |
| EP | 0 545746 | 6/1993 | C01F/17/00 |
| EP | 0 680930 | 11/1995 | C01F/17/00 |
| EP | 748767 | * 12/1996 | |
| FR | 2139620 | 1/1973 | C01F/17/00 |
| WO | WO 97/11031 | 3/1997 | C01F/17/00 |

OTHER PUBLICATIONS

M. Sato: "Preparation and Structure of Sodium Rare–Earth sulfides, NaLnS2." Materials Research Bulletin, vol. 19, No. 9, 1984, pp. 1215–1220, XP002062475. (no month).
International Search Report (Feb. 1998).

* cited by examiner

*Primary Examiner*—Anthony Green

(57) ABSTRACT

The composition is based on a samarium sesquisulphide, it exhibits a samarium purity with respect to other rare earth metals of greater than 99% and it comprises at least one alkali metal or alkaline earth metal element, at least a portion of which is included in the crystal lattice of the said sesquisulphide. According to another embodiment, the composition is based on a sesquisulphide of samarium and of at least one rare earth metal which is solely trivalent and it comprises at least one alkali metal or alkaline earth metal element, at least a portion of which is included in the crystal lattice of the said sesquisulphide. According to a third embodiment, the composition exhibits a samarium purity such that the cerium content is less than 1%. The process consists in reacting samarium, trivalent rare earth metal and alkali metal or alkaline earth metal compounds with a gaseous mixture of hydrogen sulphide and of carbon disulphide.

33 Claims, No Drawings

COMPOSITION BASED ON SAMARIUM SESQUISULPHIDE, PREPARATION METHOD AND USE AS COLORING PIGMENT

This application is an application under 35 U.S.C. Section 371 of International Application Number PCT/FR98/01775, filed on Aug. 07, 1998.

The present invention relates to a composition based on a samarium sesquisulphide, to its process of preparation and to its use as colouring pigment.

Inorganic colouring pigments are already widely used in many industries, in particular in those of paints, plastics and ceramics. In such applications, the properties, which are, inter alia, thermal and/or chemical stability, dispersibility (ability of the product to disperse correctly in a given medium), compatibility with the medium to be coloured, intrinsic colour, colouring power and opacifying power, all constitute particularly important criteria to be taken into consideration in the choice of a suitable pigment.

Unfortunately, the problem is that most of the inorganic pigments which are suitable for applications such as above and which are actually used at the present time on an industrial scale generally make use of metals (cadmium, lead, chromium and cobalt in particular) whose use is becoming increasingly severely regulated, or even banned, by legislation in many countries, this being on account of their supposed very high toxicity. Mention may thus more particularly be made, as non-limiting examples, of the case of yellow pigments of the lead chromate or cadmium sulphide type.

It is thus seen that there is a great need for novel inorganic substitution pigments.

With this aim and according to a first embodiment, the composition of the invention is characterized in that it is based on a samarium sesquisulphide, in that it exhibits a samarium purity with respect to other rare earth metals of greater than 99% and in that it comprises at least one alkali metal or alkaline earth metal element, at least a portion of which is included in the crystal lattice of the said sesquisulphide.

According to a second embodiment, the composition of the invention is characterized in that it is based on a sesquisulphide of samarium and of at least one rare earth metal which is solely trivalent and in that it comprises at least one alkali metal or alkaline earth metal element, at least a portion of which is included in the crystal lattice of the said sesquisulphide.

According to a third embodiment of the invention, the composition of the invention is characterized in that it is based on a samarium sesquisulphide, in that it exhibits a samarium purity such that the cerium content is less than 1% and in that it comprises at least one alkali metal or alkaline earth metal element, at least a portion of which is included in the crystal lattice of the said sesquisulphide.

The invention also relates to a process for the preparation of the composition according to the first embodiment, this process being characterized in that a samarium compound exhibiting a samarium purity with respect to other rare earth metals of greater than 99% and at least one compound of an alkali metal or alkaline earth metal element is reacted with a gaseous mixture of hydrogen sulphide and of carbon disulphide.

The invention also relates to the process for the preparation of a composition according to the second embodiment, this process being characterized in that a samarium compound, a compound of the trivalent rare earth metal and at least one compound of an alkali metal or alkaline earth metal element are reacted with a gaseous mixture of hydrogen sulphide and of carbon disulphide.

The invention also relates to a process for the preparation of the composition according to the third embodiment, this process being characterized in that a samarium compound exhibiting a samarium purity such that the cerium content is less than 1% and at least one compound of an alkali metal or alkaline earth metal element are reacted with a gaseous mixture of hydrogen sulphide and of carbon disulphide.

The compositions of the invention exhibit a strong yellow colour.

Other characteristics, details and advantages of the invention will become even more fully apparent on reading the description which follows and the various concrete but non-limiting examples intended to illustrate it.

The composition according to the first embodiment of the invention will now be described.

This composition is based on a samarium sesquisulphide of formula $Sm_2S_3$. It is a sesquisulphide of $\gamma$ type.

One characteristic of the composition according to this first embodiment is the purity of the samarium. The composition must exhibit a samarium purity, measured with respect to the other rare earth metals, of greater than 99%. This purity can be at least 99.5% and more particularly at least 99.9%.

Here and throughout the description, the purities are given as weight of oxides of the elements samarium, cerium and other rare earth metals.

Rare earth metal is understood to mean, throughout the description, the elements from the group consisting of yttrium and the elements of the Periodic Classification with an atomic number of between 57 and 71 inclusive.

It is known that samarium, from its preparation and separation processes, contains impurities which are essentially other rare earth metals. Samarium usually exhibits a purity of the order of 98.5%. Such a purity is insufficient in the context of the present invention for producing a pigment with an improved yellow colour.

The composition of the invention comprises, in addition, an alkali metal or alkaline earth metal element. The alkali metal element can more particularly be lithium or sodium. The alkaline earth metal element can more particularly be strontium or calcium. Of course, the sesquisulphide of the composition of the invention can comprise several alkali metal and/or alkaline earth metal elements and, consequently, everything which is disclosed subsequently with reference to an alkali metal or an alkaline earth metal also applies to the case where several alkali metals and/or alkaline earth metals are present.

According to another characteristic of the invention, this alkali metal or alkaline earth metal element is at least partly included in the crystal lattice of the sesquisulphide. According to an alternative form, the alkali metal or alkaline earth metal element is essentially or completely included in the crystal lattice.

The sesquisulphide of the composition of the invention can in particular possess a cubic crystallographic structure of $Th_3P_4$ type, which exhibits gaps for cations in the lattice; this lacunary structure can be symbolized by giving the sesquisulphides the formula $M_{10.66}[]_{1.33}S_{16}$.

According to the invention, one or more alkali metal or alkaline earth metal elements can be introduced into these cationic gaps, up to saturation or otherwise of the latter. The presence of these elements within the sesquisulphide can be demonstrated by simple chemical analysis. Moreover, X-ray diffraction analyses show that the $Th_3P_4$ crystalline phase of the sesquisulphide is retained with, in some cases, modification of the unit cell parameters to a greater or lesser extent, depending both on the nature and on the amount of the alkali metal or alkaline earth metal element introduced.

The composition according to the second embodiment of the invention is based on a sesquisulphide of samarium and of at least one other solely trivalent rare earth metal. Solely trivalent rare earth metal is understood to mean a rare earth metal which can only exhibit this one valency and thus a rare earth metal which cannot change to the di- or tetravalent state. Mention may be made, by way of example of such a solely trivalent rare earth metal, of lanthanum, gadolinium or dysprosium.

The trivalent rare earth metal/trivalent rare earth metal and samarium atomic ratio can vary within a wide range. It is generally above 90%. This ratio can more particularly be at most 50%.

The composition according to this second embodiment can furthermore be prepared from a samarium exhibiting the purity mentioned in the description of the first embodiment.

For the third embodiment of the invention, the characteristic of the composition of the invention lies in the purity of the samarium with respect to cerium. As indicated above, the cerium content must be less than 1%.

Everything which has been disclosed above for the first embodiment as regards the structure of the sesquisulphide, the alkali metal or alkaline earth metal elements and their inclusion in the crystal lattice of the sesquisulphide also applies to the second embodiment and to the third embodiment.

Generally, the amount of alkali metal element is at most 30% of the atomic amount of all the rare earth metals of the sesquisulphide (samarium, trivalent rare earth metal and other rare earth metals) and preferably at most 20%. This amount is preferably at least equal to 0.1%.

The amount of alkaline earth metal element is at most 50%, expressed as above.

Alternative forms which relate to the various embodiments of the invention will now be described.

The compositions of the invention can exhibit a specific particle size. Thus, they can be based on a sesquisulphide which is essentially composed of whole grains with a mean size of at most 1.5 microns, more particularly of at most 1 micron. Whole grain is understood to mean a grain which has not been broken or crushed. This is because grains can be crushed or broken during milling. Scanning electron microscopy photos make it possible to show that the grains have not been crushed. It should also be noted that the sesquisulphide of the composition of the invention can be deagglomerated, that is to say that, if it is not provided directly in the form of whole grains, it can be provided in the form of agglomerates which can be composed of agglomerated and/or slightly sintered grains which can give the whole grains by deagglomeration under mild conditions. Furthermore, the whole grains can be monocrystalline grains.

As regards more specifically the particle size of the compositions of the invention, the latter usually exhibit a mean particle size generally of less than 2 $\mu$m, more particularly of between 0.7 and 1.5 $\mu$m. After deagglomeration under mild conditions, the abovementioned grains can be obtained, the mean size of which can be at most 1.5 $\mu$m and advantageously between 0.6 and 0.8 $\mu$m. The size of the particles is measured by the laser diffraction technique using a particle sizer of the Cilas HR 850 (distribution by volume) type.

According to another alternative form, the composition of the invention comprises, at the surface of the particles or of the grains which constitute it, a layer based on at least one transparent oxide. Reference may be made, as regards a product of this type comprising such a layer, to European Patent Application EP-A-620,254 on behalf of the Applicant Company, the teaching of which is incorporated here.

This peripheral layer coating the support may not be perfectly continuous or homogeneous. However, preferably, the compositions according to this alternative form comprise a transparent oxide coating layer which is uniform and of controlled thickness and which does not detrimentally affect the original colour of the composition before coating.

Transparent oxide is understood to mean, in this instance, an oxide which, once deposited on the particle or the grain in the form of a more or less fine film, only absorbs light rays in the visible region to a very small extent or not at all and which does not mask, or only very slightly masks, the original intrinsic colour of the particle or grain. In addition, it should be noted that the term oxide, which is used for convenience throughout the present description relating to this alternative form, should be understood as also covering oxides of the hydrated type.

These oxides, or hydrated oxides, can be amorphous and/or crystalline.

Mention may more particularly be made, as examples of such oxides, of silicon oxide (silica), aluminium oxide (alumina), zirconium oxide (zirconia), titanium oxide, zirconium silicate $ZrSiO_4$ (zircon) and rare earth metal oxides. According to a preferred alternative form, the coating layer is based on silica. More advantageously still, this layer is essentially, and preferably solely, composed of silica.

According to another alternative form, the composition can comprise fluorine atoms.

In this case, reference may also be made, as regards the arrangement of the fluorine atoms, to European Patent Application EP-A-628,608 on behalf of the Applicant Company, the teaching of which is incorporated here.

The fluorinated compositions can exhibit at least one of the following characteristics:
  the fluorine atoms are distributed along a concentration gradient decreasing from the surface to the core of the particles or grains constituting the said compositions,
  the fluorine atoms are mainly distributed at the outer periphery of the particles or grains constituting the compositions. Outer periphery is understood to mean, in this instance, a thickness of material, measured from the surface of the particle, of the order of a few hundred angstroms. In addition, mainly is understood to mean that more than 50% of the fluorine atoms present in the sesquisulphide are found in the said outer periphery,
  the percentage by weight of fluorine atoms resent in the compositions does not exceed 10% and referably 5%,
  the fluorine atoms are present in the form of fluorinated or sulphofluorinated compounds, in particular in the form of rare earth metal fluorides or of rare earth metal sulphofluorides (thiofluorides).

According to another alternative form, the compositions of the invention can additionally comprise a zinc compound, it being possible for this zinc compound to be more particularly deposited at the surface of the particles or grains constituting these compositions. Reference may be made, for this alternative form, to French Patent Application FR-A-2,741,629 on behalf of the Applicant Company, the teaching of which is incorporated here.

This zinc compound can be obtained by reaction of a zinc precursor with aqueous ammonia and/or an ammonium salt. The form under which this zinc compound exists in the composition is not known exactly. However, in some cases, it may be thought that the zinc is present in the form of a zinc-ammonia complex of formula $Zn(NH_3)_x(A)_y$, in which A represents an anion, such as OH$^-$, Cl$^-$, the acetate anion or a mixture of anions, x is at most equal to 4 and y equal to 2.

Of course, the invention also relates to the combination of the alternative forms which have been described above. Thus, it is possible to envisage a composition in which the particles or the grains comprise an oxide layer with, in addition, fluorine atoms, it being possible for these compositions additionally to comprise zinc. In particular, for compositions comprising an oxide layer, the zinc can be included in the oxide layer or situated at the surface of the latter.

The process for the preparation of the compositions of the invention will now be disclosed.

The process consists in reacting starting compounds with a gaseous mixture of hydrogen sulphide and of carbon disulphide. In the case of the preparation of a composition according to the first embodiment, the samarium compound is a compound which must exhibit the required samarium purity, that is to say a purity of greater than 99% and of at least 99.5% and more particularly of at least 99.9%, according to the desired composition. In the case of the preparation of a composition according to the second embodiment, a compound of the trivalent rare earth metal is used, in addition to a samarium compound. In the case of the third embodiment, a samarium compound exhibiting the required cerium content (<1%) is used. In the three cases, use is additionally made of a compound of an alkali metal element and/or of an alkaline earth metal element.

The samarium and rare earth metal compounds can be oxides or carboxylate compounds, such as oxalates, acetates, malonates or tartrates. The alkali metal or alkaline earth metal compounds can be of the same type but can, in addition, be sulphides or polysulphides, or sulphates.

According to a preferred alternative form, a carbonate or a hydroxycarbonate is used as compound of samarium and optionally of the trivalent rare earth metal. It is also advantageous to use an alkali metal or alkaline earth metal carbonate. Such starting compounds make it possible to obtain compositions with a finer particle size or composed essentially of whole grains as described above. If appropriate, a mixed carbonate or hydroxycarbonate of samarium and of the trivalent rare earth metal can be employed.

It is also possible to use a samarium and/or rare earth metal carbonate or hydroxycarbonate preimpregnated with an alkali metal or alkaline earth metal element. In this case, an aqueous solution of an alkali metal or alkaline earth metal salt or hydroxide is formed and the samarium and/or rare earth metal carbonate or hydroxycarbonate is impregnated with the solution, then drying is carried out.

The mixture of sulphurizing gas can be employed with an inert gas, such as argon or nitrogen.

Heating can be carried out at a temperature of between 500 and 1200° C. and more particularly between 600 and 900° C.

The duration of the heating corresponds to the time necessary to obtain the desired sesquisulphide and this duration decreases as the temperature increases. By way of example, this duration can range from approximately 2 hours for a temperature of 500° C. to approximately 1 hour for a temperature of 800° C.

The reaction is generally carried out with a partial pressure of the hydrogen sulphide and of the carbon disulphide which is between $0.1 \times 10^5$ and $1 \times 10^5$ Pa.

Finally, the process can be carried out in an open reactor.

The product obtained on conclusion of the heating usually exhibits a suitable particle size for use as pigment. However, if it is desired to obtain a finer particle size, the product can be deagglomerated. As already mentioned above, deagglomeration under mild conditions, for example milling of the air jet type, is sufficient to obtain a mean size which can be less than 1.5 $\mu$m and, for example, of at most 1 $\mu$m and advantageously between 0.6 and 0.8 $\mu$m.

For the alternative forms which have been disclosed above and for which the compositions comprise a transparent oxide, fluorine and/or a zinc compound, these compositions are prepared by employing the processes disclosed in the abovementioned Patent Applications EP-A-620,254, EP-A-628,608 and FR-A-2,741,629.

In the case of the preparation of a composition comprising a transparent oxide, the process consists essentially in bringing the initial composition into contact with a precursor of the abovementioned transparent oxide and in precipitating the transparent oxide. Initial composition is understood to mean, here and in the remainder of the description, the composition as obtained following the reaction of the samarium and optionally trivalent rare earth metal compounds and of the alkali metal or alkaline earth metal compounds with the sulphurizing gaseous mixture and after optional deagglomeration.

Examples of processes will be given below for the various types of transparent oxides.

In the case of silica, mention may be made of the preparation of silica by hydrolysis of an alkyl silicate, a reaction mixture being formed by mixing water, alcohol, the composition, which is then suspended, and optionally a base, an alkali metal fluoride or an ammonium fluoride, which can act as catalyst of the condensation of the silicate. The alkyl silicate is subsequently introduced. It is also possible to carry out a preparation by reaction of the composition, of a silicate, of the alkali metal silicate type, and of an acid.

In the case of a layer based on alumina, the composition, an aluminate and an acid can be reacted, whereby alumina is precipitated. This precipitation can also be obtained by bringing together and by reacting the composition, an aluminium salt and a base.

Finally, the alumina can be form ed by hydrolysis of an aluminium alkoxide.

As regards titanium oxide, it can be precipitated by introducing, into an aqueous/alcoholic suspension of the composition, a titanium salt, such as TiCl$_4$, TiOCl$_2$ or TiOSO$_4$ on the one hand, and a base, on the other hand. It is also possible to carry out the preparation, for example, by hydrolysis of an alkyl titanate or precipitation of a titanium sol.

Finally, in the case of a layer based on zirconium oxide, it is possible to carry out the precipitation by cohydrolysis or coprecipitation of a suspension of the composition in the presence of an organometallic zirconium compound, for example a zirconium alkoxide, such as zirconium isopropoxide.

The composition comprising fluorine is obtained by subjecting the initial composition to a fluorination treatment.

This fluorination treatment can be carried out according to any technique known per se.

In particular, the fluorinating agent can be liquid, solid or gaseous. Preferably, the fluorination is carried out under treatment conditions where the fluorinating agent is liquid or gaseous.

Mention may more particularly be made, as examples of fluorinating agents which are suitable for the implementation of the treatment, of fluorine $F_2$, alkali metal fluorides, ammonium fluoride, rare gas fluorides, nitrogen fluoride $NF_3$, boron fluoride $BF_3$, tetrafluoromethane or hydrofluoric acid HF.

In the case of a treatment under a fluorinating atmosphere, the fluorinating agent can be used pure or diluted in a neutral gas, for example nitrogen.

The reaction conditions are preferably chosen such that the said treatment only brings about fluorination at the surface of the particles or grains constituting the composition (mild conditions). In this respect, carrying out the fluorination to the core of the particles or grains does not produce results which are substantially improved with respect to an essentially surface fluorination. In practice, it is possible to experimentally monitor and control the degree of progression of the fluorination reaction, for example by measuring the change in the increase in mass of the materials (increase in mass brought about by the gradual introduction of fluorine).

The composition comprising zinc can be obtained by bringing together the initial composition, a zinc precursor and aqueous ammonia and/or an ammonium salt. This operation of bringing together makes it possible to precipitate the zinc compound on the particles or grains constituting the composition.

The zinc precursor can be a zinc oxide or hydroxide which is used in suspension. This precursor can also be a zinc salt, preferably a soluble salt. This can be an inorganic acid salt, such as a chloride, or an organic acid salt, such as an acetate.

Various alternative forms of the process can be envisaged for the preparation of compositions in which the particles or grains comprise zinc with a layer of oxide and/or of fluorine.

According to a first alternative form, the initial composition, a zinc precursor, aqueous ammonia and/or an ammonium salt and, if appropriate, a precursor of the transparent oxide and a fluorinating agent are brought into contact and the zinc compound is deposited on the initial composition and, if appropriate, the transparent oxide is precipitated on the said initial composition.

According to a second alternative form, the fluorination treatment is carried out in a first stage and then, in a second stage, the initial composition, thus treated, a zinc precursor, aqueous ammonia and/or an ammonium salt and, if appropriate, a precursor of the transparent oxide are brought into contact and the zinc compound is deposited on the initial composition and, if appropriate, the transparent oxide is precipitated on the said initial composition.

A third alternative form of the process can also be envisaged. In this case, in a first stage, the initial composition, a zinc precursor, aqueous ammonia and/or an ammonium salt and, if appropriate, a precursor of the transparent oxide are brought into contact and the zinc compound is deposited on the initial composition and, if appropriate, the transparent oxide is precipitated on the said initial composition, then, in a second stage, the fluorination treatment is carried out.

Another alternative form of the process is also possible. In this case, in a first stage, the initial composition and a precursor of the transparent oxide are brought into contact and the transparent oxide is precipitated on the said initial composition, then, in a second stage, the initial composition, thus treated, is brought into contact with a zinc precursor, aqueous ammonia and/or an ammonium salt, and the zinc compound is deposited on the initial composition.

In the case of the latter alternative form, the fluorination treatment can be carried out during one of the abovementioned stages or before the first or after the second.

According to another advantageous alternative form of the process, the operation of bringing the composition, the zinc precursor, the aqueous ammonia and/or the ammonium salt and, if appropriate, the precursor of the transparent oxide and the fluorinating agent in contact is carried out in the presence of an alcohol. The alcohol used is generally chosen from aliphatic alcohols, such as, for example, butanol or ethanol. The alcohol can, in particular, be introduced with the zinc precursor in the form of an alcoholic zinc solution.

According to yet another advantageous alternative form of the process, the composition, the zinc precursor, the aqueous ammonia and/or the ammonium salt and, if appropriate, the precursor of the transparent oxide and the fluorinating agent are brought into contact in the presence of a dispersant. The aim of this dispersant is to prevent the agglomeration of the particles or grains of the composition during their suspending for the abovedescribed treatments. It also makes it possible to operate in more concentrated mixtures. It promotes the formation of a homogeneous layer of transparent oxide over all the particles.

This dispersant can be chosen from the group of dispersants which disperse by a steric effect and in particular non-ionic water-soluble or organosoluble polymers. Mention may be made, as dispersant, of cellulose and its derivatives, polyacrylamides, poly(ethylene oxide)s, poly (ethylene glycol)s, polyoxyethylenated poly(propylene glycol)s, polyacrylates, polyoxyethylenated alkylphenols, polyoxyethylenated long chain alcohols, poly(vinyl alcohol) s, alkanolamides, dispersants of the polyvinylpyrrolidone type or compounds based on xanthan gum.

In addition, it should be noted that it can be advantageous to treat with ultrasound the suspension obtained from the mixture of the reactants.

Finally, the product obtained at the end of the operations described above can be washed with water or with alcohol. It can also be dried in the air or under vacuum.

The invention also relates to the use of a composition according to the invention as colouring pigment for colouring a material.

This is because the composition of the invention has a good colouring power and a good covering power and, for this reason, is suitable for the colouring of numerous materials, such as plastics, paints and others.

Thus, and more specifically, it can be used in the colouring of polymers for plastics which can be of the thermoplastic or thermosetting type.

Compositions comprising zinc are very particularly suited for applications in which they are employed at a relatively high temperature and under conditions where there is a risk of $H_2S$ being released as a result, possibly, of a partial hydrolysis of the sulphur-comprising compound. More specifically, they can be used in the colouring of polymers for plastics which can be of the thermoplastic or thermosetting type, these polymers being capable of containing traces of water.

Mention may be made, as thermoplastic resins capable of being coloured according to the invention, purely by way of illustration, of poly(vinyl chloride), poly(vinyl alcohol), polystyrene, styrene-butadiene, styrene-acrylonitrile and acrylonitrile-butadienestyrene (A.B.S.) copolymers, acrylic polymers, in particular poly(methyl methacrylate), polyolefins, such as polyethylene, polypropylene, polybutene or polymethylpentene, cellular derivatives, such as, for example, cellulose acetate, cellulose acetobutyrate or ethylcellulose, or polyamides, including polyamide-6,6.

As regards the thermosetting resins for which the composition according to the invention is also suitable, mention may be made, for example, of phenoplasts, aminoplasts, in particular ureaformaldehyde or melamine-formaldehyde copolymers, epoxy resins and thermosetting polyesters.

The composition of the invention can also be employed in special polymers, such as fluorinated polymers, in particular polytetrafluoroethylene (P.T.F.E.), polycarbonates, silicone elastomers or polyimides.

In this specific application for the colouring of plastics, the composition of the invention can be employed directly in the form of powders. It is also possible, preferably, to employ it in a predispersed form, for example as a premix with a portion of the resin, or in the form of a concentrated paste or of a liquid, which makes it possible to introduce it at any stage in the manufacture of the resin.

Thus, the composition according to the invention can be incorporated into plastics, such as those mentioned above, in a proportion by weight generally ranging either from 0.01 to 5% (relative to the final product) or from 20 to 70%, in the case of a concentrate.

The composition of the invention can also be used in the field of paints and varnishes and more particularly in the following resins: alkyd resins, the most common of which is named glyceryl phthalate resin; resins modified with long or short oil; acrylic resins derived from esters of acrylic acid (methyl or ethyl) and methacrylic acid, optionally copolymerized with ethyl, 2-ethylhexyl or butylacrylate; vinyl resins, such as, for example, poly(vinyl acetate), poly(vinyl chloride), poly(vinyl butyral), poly(vinyl formal), and vinyl chloride and vinyl acetate or vinylidene chloride copolymers; phenolic or aminoplast resins, generally modified; polyester resins; polyurethane resins, epoxy resins; or silicone resins.

The composition is generally employed in the proportion of 5 to 30% by weight of the paint and of 0.1 to 5% by weight of the varnish.

In addition, the composition according to the invention is also capable of being suitable for applications in the rubber industry, in particular in floor surfacings, in the paper and printing inks industry, in the field of cosmetics, and for many other uses, such as, for example, and in a non-limiting manner, dyes, in leathers, for finishing the latter, and laminated coatings for kitchens and other work surfaces, ceramics and glazes.

The composition of the invention can also be used in the colouring of materials based on or obtained from at least one inorganic binder.

This inorganic binder can be chosen from hydraulic binders, air-cured binders, plaster and binders of the anhydrous or partially hydrated calcium sulphate type.

Hydraulic binders is understood to mean substances having the property of setting and of hardening after addition of water with the formation of water-insoluble hydrates. The products of the invention apply very particularly to the colouring of cements and, of course, of the concretes manufactured from these cements by addition to the latter of water, of sand and/or of gravel.

In the context of the present invention, the cement can be, for example, of the aluminous type. This is understood to mean any cement containing a high proportion either of alumina as such or of aluminate or of both. Mention may be made, as examples, of cements based on calcium aluminate, in particular those of the Secam type.

The cement can also be of the silicate type and more particularly based on calcium silicate. Examples which may be given are Portland cements and, in cements of this type, quick-setting or very-quick-setting Portland cements, white cements, those which are resistant to sulphates and those comprising blast furnace slag and/or fly ash and/or metakaolin.

Mention may also be made of cements based on calcium sulphate hemihydrate and magnesia cements, known as Sorel cements.

The composition of the invention is also used in the colouring of air-cured binders, that is to say binders which harden in the open air by the action of $CO_2$, of the calcium or magnesium oxide or hydroxide type.

Finally, the composition of the invention is used in the colouring of plaster and binders of the anhydrous or partially hydrated calcium sulphate type ($CaSO_4$ and $CaSO_4.1/2H_2O$).

Finally, the invention relates to coloured compositions of a material, in particular of the plastics, paints, varnishes, rubbers, ceramics, glazes, papers, inks, cosmetic products, dyes, leathers or laminated coatings type or of the type based on or obtained from at least one inorganic binder, which comprise a composition according to the invention as colouring pigment.

Examples will now be given.

In all the examples given below, the following definitions and procedures apply.

Preparation of the Products

Use is made, as starting material, of 10 g of a samarium hydroxycarbonate or a mixed samarium and trivalent rare earth metal hydroxycarbonate which has been impregnated with a carbonate of the alkali metal element in solution. The amounts of reactants are determined as a function of the stoichiometry of the desired final product. The starting material is subsequently brought to 800° C. for 1 hour under a continuous stream, at a flow rate of 6 l/h, of a gaseous mixture containing argon, hydrogen sulphide and carbon disulphide (Ar 50%, $H_2S$ 20% and $CS_2$ 30% by volume).

On conclusion of the calcination, the product is deagglomerated under mild conditions using an air jet mill.

Particle Size

The particle size was determined according to the above-mentioned Cilas technique. In addition, it is specified that the measurement was carried out on a dispersion of the product in a 0.05% by weight aqueous sodium hexametaphosphate solution which was subjected beforehand to the effect of an ultrasound probe (probe with a tip with a diameter of 13 mm, 20 KHz, 120 W) for 3 minutes. Dispersion index is understood to mean the ratio:

$$\sigma/m=(d_{90}-d_{10})/2d_{50}$$

in which:

$d_{90}$ is the diameter of the particles for which 90% of the particles have a diameter of less than $d_{90}$;

$d_{10}$ is the diameter of the particles for which 10% of the particles have a diameter of less than $d_{10}$;

$d_{50}$ is the mean diameter of the particles.

Chromaticity Coordinates

The chromaticity coordinates L*, a* and b* are given here and throughout the description in the CIE 1976 system (L*, a* and b*), as defined by the Commission Internationale d'Eclairage [International Commission on Illumination] and listed in the Recueil des Normes Francaises [Compendium of French Standards] (AFNOR), calorimetric colour No. X08-12, No. X08-14 (1983). They are determined, as regards measurements carried out on the products and the plastics, by means of a calorimeter sold by the company Pacific Scientific. The nature of the illuminant is $D_{65}$. The observation surface is a circular pellet with a surface area of 12.5 cm$^2$. The observation conditions correspond to viewing under an aperture angle of 10°. In the measurements given, the specular component is excluded for the powders and included for the small plates.

R400 and R700 represent the reflectivity at 400 nm and 700 nm under the abovementioned measuring conditions.

Injection Into the Plastic

The product is incorporated into Eltex® PHV 001 reference polypropylene in a rotating vessel in a proportion by weight of 1%. The mixture is subsequently injected at 220° C. using a Kapsa injection moulding machine, model Protoject 10/10, with a cycle of 41 s. The mould is maintained at a temperature of 35° C.

A parallelepipedal double-thickness (2 and 4 mm) test specimen is thus obtained.

The chromaticity coordinates are measured on the thick part of the small plate and on a white background.

EXAMPLE 1

This example relates to the preparation of a sulphide, $\gamma$-$Sm_2S_3$, doped with lithium. The Li/Sm ratio is 0.15 and a samarium hydroxycarbonate obtained from samarium with a purity of 99.9% is used.

The particle size obtained is 0.7 $\mu$m ($\sigma$/m=1.7).

The chromaticity coordinates, determined in the CIE Lab system, are:

$L^*/a^*/b^*/R400/R700$=84.7/−2.6/77.2/5.9/82.7.

After injection into polypropylene (pigment content=1%), the chromaticity coordinates become:

$L^*/a^*/b^*$=84.5/−2.7/78.3.

EXAMPLE 2

This example relates to the preparation of a sulphide, $\gamma$-$Sm_2S_3$, doped with sodium. The Na/Sm ratio is 0.2 and a samarium hydroxycarbonate obtained from samarium with a purity of 99.9% is used.

The particle size obtained is 0.6 $\mu$m ($\sigma$/m=0.5).

The chromaticity coordinates, determined in the CIE Lab system, are:

$L^*/a^*/b^*/R400/R700$=87.2/−4.1/76.3/5.9/86.4.

After injection into polypropylene (pigment content=1%), the chromaticity coordinates become:

$L^*/a^*/b^*$=86.9/−4.3/78.8.

EXAMPLE 3

This example relates to the preparation of a sulphide, $\gamma$-$(Sm_{0.9}La_{0.1})_2S_3$, doped with lithium. The Li/Sm ratio is 0.15 and a mixed samarium and lanthanum (90% Sm/10% La) hydroxycarbonate obtained with a samarium with a purity of 98.5% is used.

The particle size obtained is 1.1 $\mu$m ($\sigma$/m=1.7).

The chromaticity coordinates, determined in the CIE Lab system, are:

$L^*/a^*/b^*/R400/R700$=86.1/−2.9/78.2/5.7/86.9.

After injection into polypropylene (pigment content=1%), the chromaticity coordinates become:

$L^*/a^*/b^*$=85/−1.4/78.4.

EXAMPLE 4

This example relates to the preparation of a sulphide, $\gamma$-$(Sm_{0.5}La_{0.5})_2S_3$, doped with lithium. The Li/Sm ratio is 0.15 and a mixed samarium and lanthanum (50% Sm/50% La) hydroxycarbonate obtained from samarium with a purity of 99.9% is used.

The particle size obtained is 1.8 $\mu$m ($\sigma$/m=1.2).

The chromaticity coordinates, determined in the CIE Lab system, are:

$L^*/a^*/b^*/R400/R700$=86.4/−2.5/76.6/6.2/85.8.

After injection into polypropylene, the chromaticity coordinates become:

$L^*/a^*/b^*$=85.4/−4/76.1.

The following examples relate to products which have been subjected, after their preparation, to additional treatments in order to obtain a layer of a transparent oxide, in order to introduce zinc and, optionally, fluorine.

The treatment for the deposition of the oxide layer and the introduction of zinc is as follows.

Polyvinylpyrrolidone (PVP) is dissolved in ethanol.

The optionally fluorinated samarium sulphide is added to this solution, followed by the aqueous ammonia solution and finally the zinc precursor. Ethyl silicate is introduced continuously over 2 hours. After the end of introduction of the ethyl silicate, maturing is carried out for 2 hours. The particles thus obtained are washed with ethanol by filtration and then dried at 50° C. for 12 hours.

EXAMPLE 5

This example relates to a $\gamma$-$Sm_2S_3$ doped with sodium (Na/Sm=0.2) with samarium with a purity of 99.90%.

The reactants are used in the following proportions:

|  | g of product/kg of suspension |
|---|---|
| Samarium sulphide | 200 |
| Ethanol (95%) | 643 |
| Aqueous ammonia (32%) | 100 |
| Zinc oxide | 20 |
| Ethyl silicate | 32 |
| PVP K10 (Company Aldrich) Mw = 10,000 | 5 |

The samarium sulphide used is a samarium sulphide with a $\gamma$ cubic structure ($Th_3P_4$) doped with sodium in an Na/Sm atomic ratio of 0.2. This sulphide was fluorinated beforehand in the following way. 10 g of product are introduced into 100 ml of an ammonium fluoride solution (5% by mass with respect to $Sm_2S_3$).

The pH of the mixture is brought to 8 by addition of an aqueous ammonia solution and the mixture is left stirring for one hour. The product is subsequently filtered off and then dried in a desiccator under vacuum.

The product thus obtained is treated, by employing the operating conditions given above, by using aqueous ammonia.

The product obtained exhibits the following chromaticity coordinates:

$L^*/a^*/b^*/R400/R700$=82/−1.4/71.6/7/76.3 and a particle size of 1.7 μm (σ/m=1.2).

After injection into polypropylene, the chromaticity coordinates become:

$$L*/a*/b*=83.4/-2.8/77.8.$$

EXAMPLE 6

This example relates to a sulphide, γ-$Sm_2S_3$, doped with sodium (Na/Sm=0.2) with samarium with a purity of 99.9%.

The reactants are used in the following proportions:

|  | g of product/kg of suspension |
|---|---|
| Samarium sulphide | 200 |
| Ethanol (95%) | 643 |
| Aqueous ammonia (32%) | 100 |
| Zinc oxide | 20 |
| Ethyl silicate | 32 |
| PVP K10 (Company Aldrich) Mw = 10,000 | 5 |

The samarium sulphide used is a samarium sulphide with a γ cubic structure ($Th_3P_4$) doped with sodium in an Na/Sm atomic ratio of 0.2. This sulphide was not fluorinated beforehand. The product is treated by employing the operating conditions given above, aqueous ammonia being used.

The product obtained exhibits the following chromaticity coordinates:

$$L*/a*/b*/R400/R700=82.5/-2.2/71.5/6.7/76.7$$

and a particle size of 1.1 μm (σ/m=1.1).

After injection into polypropylene, the chromaticity coordinates become:

$$L*/a*/b*=83.1/-1.3/77.8.$$

What is claimed is:

1. A yellow samarium sesquisulphide, comprising a crystal lattice comprising samarium and rare earth metals different from samarium, the samarium purity being greater than 99% with respect to rare earth metals, and comprising at least one alkali metal or alkaline earth metal element, at least a portion of which being included in the crystal lattice of said sesquisulphide.

2. A yellow samarium sesquisulphide according to claim 1, wherein the samarium purity is of at least 99.5%.

3. A yellow samarium sesquisulphide according to claim 2, wherein the samarium purity is of at least 99.9%.

4. A yellow samarium sesquisulphide according to claim 1, wherein the alkali metal element is lithium or sodium.

5. A yellow samarium sesquisulphide according to claim 1, wherein the sesquisulphide is in the form of whole grains with a mean size of at most 1.5 μm.

6. A yellow samarium sesquisulphide according to claim 1, being in the form of particles whose surface has a layer of at least one transparent oxide.

7. A yellow samarium sesquisulphide according to claim 6, wherein the transparent oxide is selected from the group consisting of silica, alumina, zirconia, titanium oxide, zircon and rare earth metal oxides.

8. A yellow samarium sesquisulphide according to claim 1, further comprising fluorine atoms, in an amount not exceeding 10% by weight.

9. A yellow samarium sesquisulphide according to claim 8, being in the form of particles, with a surface and a core, whose surface has a layer of at least one transparent oxide, wherein the fluorine atoms are distributed along a decreasing gradient from the surface to the core of the particles.

10. A yellow samarium sesquisulphide according to claim 1, being in the form of particles or grains, comprising a zinc compound deposited at the surface of the particles or grains.

11. A yellow samarium sesquisulphide according to claim 10, wherein the zinc compound is obtained by reaction of a zinc precursor with aqueous ammonia or an ammonium salt.

12. A process for the preparation of a yellow samarium sesquisulphide as defined in claim 1, comprising the steps of:

a) reacting a samarium compound having a samarium purity greater than 99% with respect to the rare earth metals and at least one compound of an alkali metal or alkaline earth metal element with a gaseous mixture of hydrogen sulphide and of carbon disulphide, and b) recovering said yellow samarium sesquisulphide.

13. A process according to claim 12, wherein the samarium compound is a samarium carbonate or a samarium hydroxycarbonate.

14. A process for the preparation of a yellow samarium sesquisulphide as defined in claim 6, comprising the steps of:

a) contacting said yellow samarium sesquisulphide with a precursor of the transparent oxide, b) precipitating said transparent oxide, and c) recovering said yellow samarium sesquisulphide.

15. A process for the preparation of a yellow samarium sesquisulphide as defined in claim 10, comprising the steps of:

a) bringing into contact a yellow samarium sesquisulphide, a zinc precursor and aqueous ammonia or an ammonium, and b) recovering the yellow samarium sesquisulphide in the form of particles or grains with a zinc compound deposited at the surface of the particles or grains.

16. A process for colouring a material, comprising the step of adding to said material a colouring amount of a yellow samarium sesquisulfide as defined in claim 1.

17. A material comprising a yellow samarium sesquisulfide as defined in claim 1.

18. A material according to claim 17, wherein the material is a plastic, a paint, a varnish, a rubber, a ceramic, a glaze, a paper, an ink, a cosmetic product, a dye, a leather, or a laminating coating.

19. A yellow samarium sesquisulphide, comprising a crystal lattice, comprising samarium, one or more solely trivalent rare earth metals, and at least one alkali metal or alkaline earth metal element, at least a portion of said alkali metal or alkaline earth metal element being included in the crystal lattice of said sesquisulphide.

20. A yellow samarium sesquisulphide according to claim 19, wherein the atomic ratio between the amount of solely trivalent rare earth metals and the sum of the amounts of trivalent solely rare earth metals and samarium is at most 90%.

21. A yellow samarium sesquisulphide according to claim 20, wherein the atomic ratio between the amount of solely trivalent rare earth metals and the sum of the amounts of trivalent solely rare earth metals and samarium atomic ratio is at most 50%.

22. A yellow samarium sesquisulphide according to claim 19, wherein the trivalent rare earth metal is lanthanum, gadolinium or dysprosium.

23. A yellow samarium sesquisulphide according to claim 19, wherein the alkali metal element is lithium or sodium.

24. A yellow samarium sesquisulphide according to claim 19, being in the form of particles whose surface has a layer of at least one transparent oxide.

25. A yellow samarium sesquisulphide according to claim 19, further comprising fluorine atoms, in an amount not exceeding 10% by weight.

26. A yellow samarium sesquisulphide according to claim 19, being in the form of particles or grains, comprising a zinc compound deposited at the surface of the particles or grains.

27. A process for the preparation of a yellow samarium sesquisulphide as defined in claim 19, comprising the steps of:
   a) reacting a samarium compound, a compound of the trivalent rare earth metal and at least one compound of an alkali metal or alkaline earth metal element with a gaseous mixture of hydrogen sulphide and of carbon disulphide, and
   b) recovering said yellow samarium sesquisulphide.

28. A yellow samarium sesquisulphide, comprising a crystal lattice, comprising cerium and samarium, whose purity is such that the cerium is present in an amount of less than 1%, and further comprising at least one alkali metal or alkaline earth metal element, at least a portion of which being included in the crystal lattice of said sesquisulphide.

29. A yellow samarium sesquisulphide according to claim 28, wherein the alkali metal element is lithium or sodium.

30. A yellow samarium sesquisulphide according to claim 28, being in the form of particles whose surface has a layer of at least one transparent oxide.

31. A yellow samarium sesquisulphide according to claim 28, further comprising fluorine atoms, in an amount not exceeding 10% by weight.

32. A yellow samarium sesquisulphide according to claim 28, being in the form of particles or grains, comprising a zinc compound deposited at the surface of the particles or grains.

33. A process for the preparation of a yellow samarium sesquisulphide as defined in claim 28, comprising the steps of:
   a) reacting a samarium compound having a cerium content of less than 1% and at least one compound of an alkali metal or alkaline earth metal element with a gaseous mixture of hydrogen sulphide and of carbon disulphide, and
   b) recovering said yellow samarium sesquisulphide.

* * * * *